Figure 1:
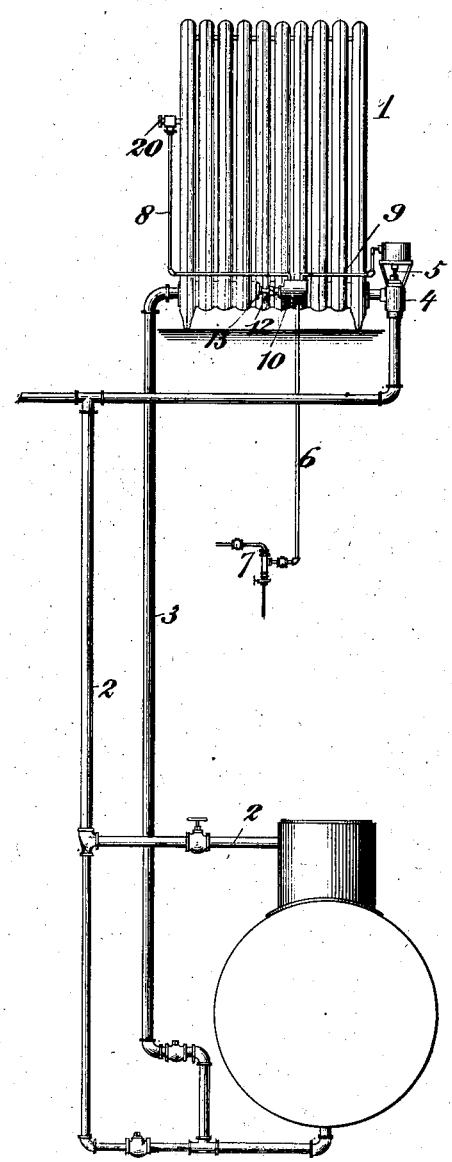

No. 833,891. PATENTED OCT. 23, 1906.
A. G. PAUL.
HEATING SYSTEM.
APPLICATION FILED AUG. 5, 1896.

4 SHEETS—SHEET 1.

WITNESSES:

INVENTOR
Andrew G. Paul
BY
Witter & Kenyon
his ATTORNEYS

No. 833,891. PATENTED OCT. 23, 1906.
A. G. PAUL.
HEATING SYSTEM.
APPLICATION FILED AUG. 5, 1896.

4 SHEETS—SHEET 2.

WITNESSES:
Geo. W. Mills Jr.
Charles J. Pupki.

INVENTOR
Andrew G. Paul
BY
Witter & Kenyon
his ATTORNEYS

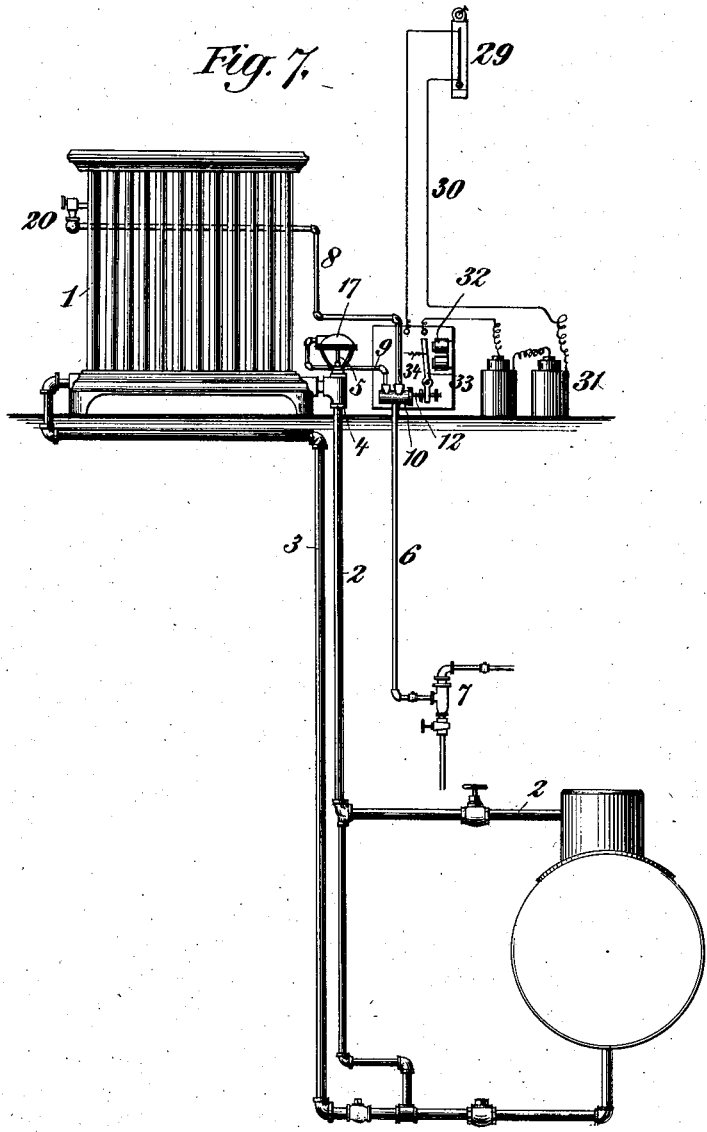

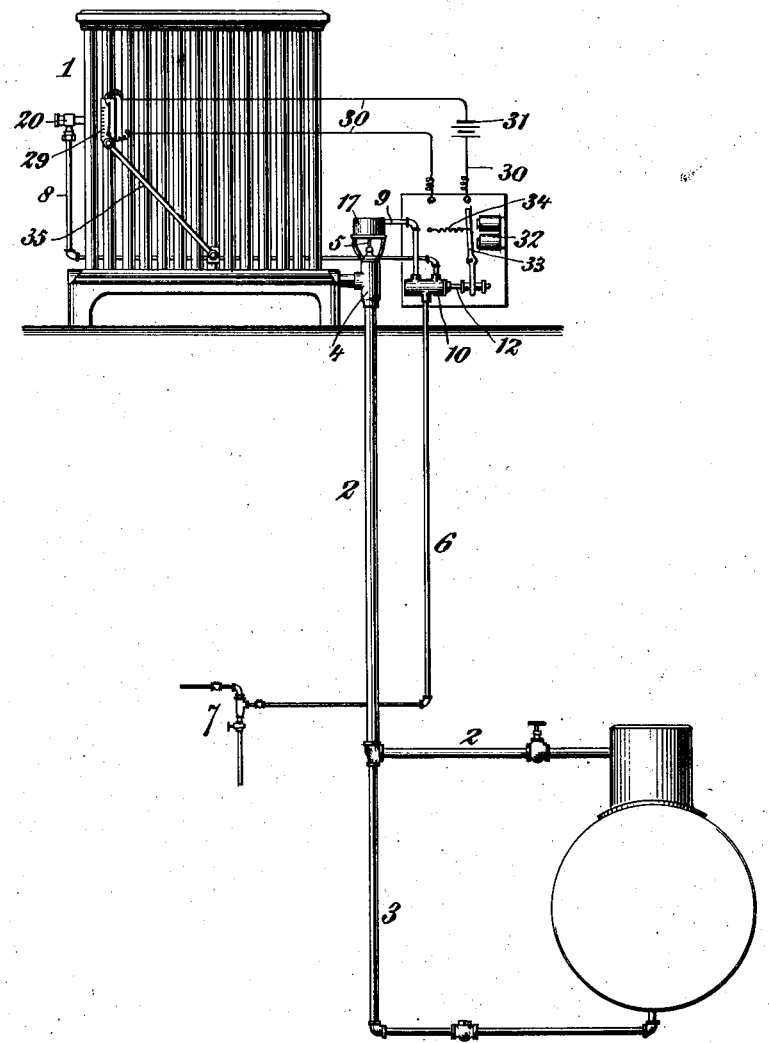

UNITED STATES PATENT OFFICE.

ANDREW G. PAUL, OF BOSTON, MASSACHUSETTS.

HEATING SYSTEM.

No. 833,891.	Specification of Letters Patent.	Patented Oct. 23, 1906.

Application filed August 5, 1896. Serial No. 601,704.

*To all whom it may concern:*

Be it known that I, ANDREW G. PAUL, a citizen of the United States, and a resident of Boston, in the county of Suffolk and State of Massachusetts, have invented a new and useful Improvement in Heating Systems, of which the following is a full, clear, and exact specification, reference being had to the accompanying drawings, which form a part hereof.

This invention relates to heating systems in which a pipe or passage is provided for the escape of the air from the heater or radiator or system and an exhauster connected with this pipe or passage, and it is especially applicable to a system such as that shown in the drawings of United States patent to Skiffington, No. 464,946, of December 8, 1891, wherein the air-pipe is additional to the supply and return pipe or pipes. It may be used either with a single-pipe or a double-pipe system. Its object is to automatically and accurately control the amount of heat given off from the system, and thereby to regulate the temperature of the room or space that is being heated, and to secure economy in the operation of the system.

The invention consists, first, in the combination, with a radiator or heater, a supply-pipe, and a valve for controlling the radiator or heater, of an air-pipe for removing air from the radiator or heater, a vacuum-chamber connected with the controlling-valve by which that valve can be operated, a pipe connecting the air-pipe with the vacuum-chamber, an exhauster connected with the air-pipe, and suitable means for opening and closing the air-pipe and for opening and closing the pipe connecting the air-pipe with the vacuum-chamber, whereby the controlling-valve may be opened when air is being drawn from the radiator or heater and may be closed when the air-outlet is closed.

The invention consists also in the combination, with the supply-pipe and supply-valve and the other necessary parts of a heating system, of an air-pipe for removing air from the radiator or heater or system, a vacuum-chamber connected with the valve on the supply-pipe by which that valve can be operated, a pipe connecting the air-pipe with the vacuum-chamber, and an exhauster connected with the air-pipe, the parts being so connected and arranged that the exhauster, through and by means of the air-pipe and its connections, removes the air from the radiator or heater or system and at the same time operates the supply-valve, whereby the supply-valve is opened when air is being drawn from the heater or radiator and closed when the air-outlet is closed.

The invention also consists in the combination, with the parts or elements already named, of a valve on the air-pipe adapted to shut off the connection with the vacuum-chamber when the connection with the heater or radiator is opened and to open the connection with the vacuum-chamber when the connection with the radiator or heater is shut off, whereby the exhauster operates to close the supply-valve when the air-outlet is closed and to open the supply-valve when the air-outlet is opened.

The invention also consists in the combination, with the parts or elements already named, of a special form of valve hereinafter described and claimed.

The invention also consists in certain other features of construction and combinations of parts hereinafter described and claimed.

The invention is fully illustrated in the accompanying drawings, in which—

Figure 2:
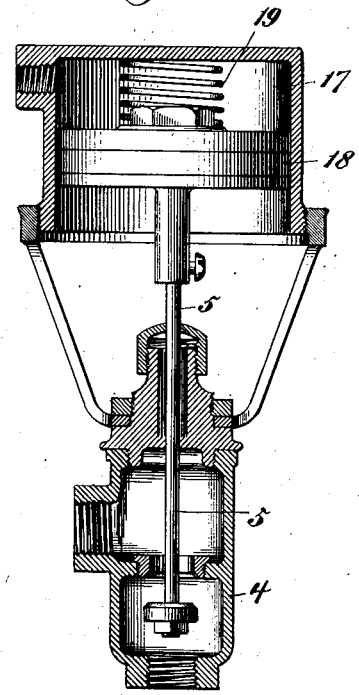
Figure 3:
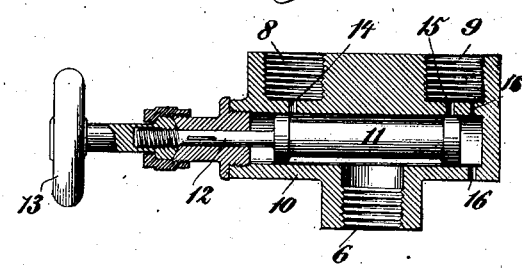
Figure 4:
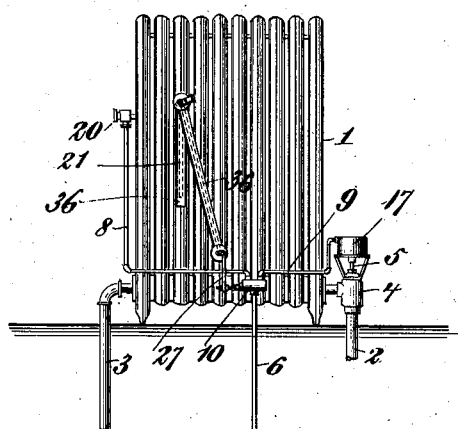
Figure 6:
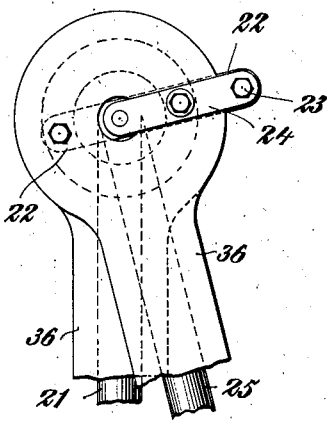
Figure 5:
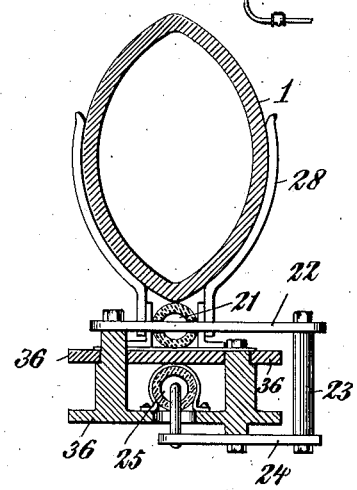
Figure 5:
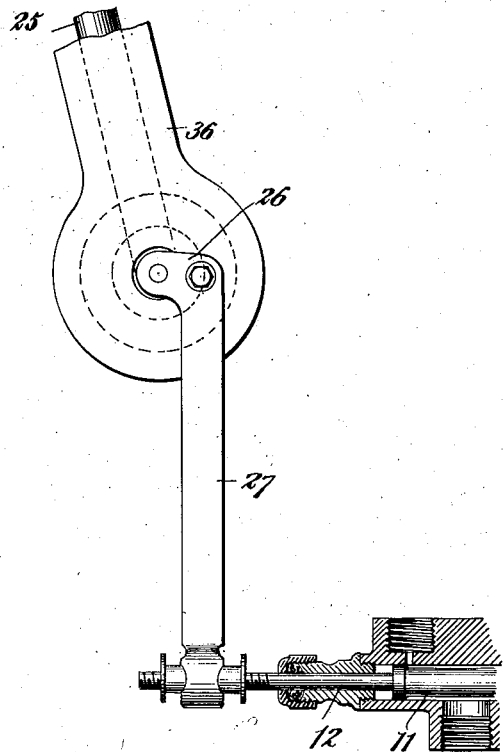

Figure 1 shows my improvement applied to an ordinary radiator or heater. Fig. 2 is a sectional view of the valve on the supply-pipe. Fig. 3 is a sectional view of the valve on the air-pipe, this valve being shown as a hand-valve. Fig. 4 shows another form of my improvement in which the valve on the air-pipe is operated by a thermostat adapted to be applied to different parts of the radiator. Fig. 5 is a horizontal sectional view of the radiator-tube to which the thermostat is attached, showing a top view of the connections between the thermostat and the valve on the air-pipe. Fig. 6 shows details of these connecting parts. Fig. 7 shows another form of the invention. Fig. 8 shows the preferred form of the improvement.

Similar numbers indicate similar parts in the several figures.

Referring to Figs. 1-3, 1 is an ordinary radiator. 2 is the supply-pipe. 3 is the return-pipe. 4 is the valve on the supply-pipe. 5 is the stem of the supply-valve. 6 is a section of the air-pipe leading to the exhauster 7. Any suitable form of exhauster may be used. I prefer to use a jet of steam or water. 8 is the air-pipe leading to the radiator. 9 is a connecting-pipe connecting the air-pipe with the vacuum-chamber 17 of the supply-valve. 10 is a valve on the air-pipe at the junction of the pipes 6, 8, and 9. The construction of this valve is clearly shown in Fig. 3. 11 is the piston of the valve. It has two heads and a middle portion of smaller diameter. 12 is the stem or rod of the piston. 13 is a hand-wheel by which the piston is moved. In the form shown the shank to which the hand-wheel is fastened is provided with a thread, which takes in a thread on the stem 12; but the form of connection may be greatly varied. By turning the hand-wheel the piston 11 is moved back and forth. The piston is kept from revolving with the hand-wheel by a pin-and-slot connection between the stem 12 and the casing of the valve or in any other suitable way. 14 is a port connecting the pipe 8 with the interior chamber of the valve. 15 is a port connecting the pipe 9 with the interior chamber of the valve. 16 16 are two ports by means of which the atmosphere can enter through the chamber of the valve into the pipe 9 and through that pipe into the vacuum-chamber 17. When the piston 11 is in the position shown in Fig. 3, the pipe 6 and the exhauster are in communication through the port 14 with the pipe 8, and thereby with the radiator, so that any air in the radiator will be drawn out. The port 15 is closed. The ports 16 16 are open, so that the atmospheric pressure will extend through the pipe 9 into the vacuum-chamber 17, which will cause the supply to remain open, so as to admit steam to the radiator. When the piston 11 is moved to the right, the port 14 will be closed, thus closing the air-outlet from the radiator, the port 15 will be opened, and the ports 16 16 will be closed, thus connecting the pipe 9 with the pipe 6 and the exhauster and producing a vacuum in the chamber 17, and thereby closing the supply-valve. 18 is a piston connected with the stem 5 of the supply-valve, and 19 is a spring tending to force this piston down and open the supply-valve. The piston and its connected parts form a fluid-pressure motor for actuating the valve on the supply-pipe. 20 is an ordinary thermostatic valve on the air-pipe 8.

The operation of the system is as follows: The heating vehicle is turned on, the valve 10 being in the position shown in Fig. 3. The supply-valve 4 will be open. The air-pipe 8 being in communication with the pipe 6, air will be drawn out from the radiator. When the temperature has risen sufficiently, the valve 10 is moved so as to shut off the pipe 8 from the exhauster and connect the pipe 9 with the exhauster, the air-outlet is closed, and at the same time the steam inlet or supply valve is closed. No more air can escape from the radiator and no more steam can enter. The steam in the radiator quickly condenses, and the temperature of the radiator falls. When more heat is desired, the valve 10 is turned back again. Air is again withdrawn and steam admitted. The radiator is in this way easily and rapidly controlled and regulated. The air-pipe and the supply-pipe are opened or closed at the same time by the same means.

Referring to Figs. 4-6, the parts correspondingly numbered are the same as those already described. The exhauster is not shown. The valve 10 is not shown in detail. It is constructed as already explained. The valve 10 is operated by a thermostat 21. This consists of a rod of metal or other suitable expansible material. It is supported in any suitable manner, as by the frame 36, and in such a way that it can be placed against any one of the radiator-tubes and held in such position by the clips 28. (See Fig. 5.) At its lower end the rod 21 is permanently attached to the frame 36. At its upper end the rod 21 is connected to the lever 22, which is pivoted at one end to the frame 36 and is connected at its other end with the lever 24 by means of the pin 23. The lever 24 is pivoted between its ends to the frame 36 and at its other end is connected with the rod 25. The rod 25 is adapted to slide in the frame 36. At its lower end it is pivoted to the short arm 26 of a lever, the long arm 27 of which is connected with the stem 12 of the valve 10. The frame or support 36 for the thermostat is made in two parts, which are hinged together at their upper ends in any suitable manner. The lower end of the inclined portion is hinged in any suitable way to the radiator. This frame supports the expanding member and its connecting-levers and rods in whatever position they may be put and enables the expanding member to be clipped to any tube of the radiator. If eight tubes of the radiator are sufficient to do the work of heating, the expanding member 21 is fastened to the eighth tube in the manner shown in Fig. 5, the valve 10 being in the position shown in Fig. 3. Steam is turned on and, the supply-valve being open, enters the radiator. At the same time the air is drawn out from the radiator through pipes 8 and 6. When the steam reaches the eighth tube, it heats that tube, and thereby expands the member 21. This raises the lever 22, and thereby moves the lever 24 and forces the rod 25 down in the frame. This moves the lever 26 27 and the valve-stem 12 and moves the piston 11 to the other end of the valve-chamber. This closes the air-pipe 8 and closes the supply-valve in the manner already explained. No more steam can enter the radiator and no more air can escape therethrough until the steam in the eighth tube has partly or wholly condensed and that tube has been cooled, so as to cause the member 21 to contract, and thereby move back the piston 11 and open the air-pipe and the supply-valve. When this occurs, steam again enters the radiator and air is again drawn therefrom until the steam reaches and heats the eighth tube, when the air-pipe and supply-valve are again closed, as before.

Referring to Fig. 7, the parts correspondingly numbered are the same as those already described. 29 is a thermostat in the form of a thermometer filled with mercury and provided with two contact-points. It is adapted to be placed at any suitable point in the room or space to be heated. 30 is an electric circuit. 31 is a battery. 32 is an electromagnet. 33 is an armature pivoted at the middle and attached at one end to the stem 12 of the valve 10. 34 is a spring connected with the armature and tending to draw the same away from the magnet. When the temperature of the room reaches the desired point, the mercury expanding closes the circuit. The armature 33 moves the stem 12, and thereby the piston, so as to connect the pipe 6 and exhauster with the pipe 9 and close the pipe 8, and thereby close the air-outlet and supply-valve. When the temperature falls, the circuit is broken, and the spring 34 draws the armature and the valve-piston back to their original position, thereby opening the air-outlet and the supply-valve again.

Referring to Fig. 8, the parts correspondingly numbered are the same as those already described. This is the preferred form of my invention. The thermostat 29 is adapted to be applied to any tube of the radiator and is supported by the arm 35, which is hinged at one end to the thermostat and at the other end to the radiator. The thermostat operates the valve 10 through and by means of an electric circuit, magnet, and armature, as above set forth. By applying the thermostat to different tubes or parts of the radiator the special features of operation are secured which have already been explained in connection with Fig. 4.

A thermostatic valve for the purposes of this invention is any agency or mechanism through which a valve is operated by changes of temperature.

By my invention the operation of the system can be easily and accurately controlled and the temperature regulated with precision and uniformity of temperature secured. When the temperature has risen to the desired or predetermined point, both the supply-valve and the air-outlet are closed. No more air can escape and no more steam can enter until, when the temperature has fallen, the supply-valve and air-pipe are again opened. By employing a thermostat adapted to be applied to different parts of the radiator the amount of heating-surface called into action can be easily and positively regulated. By employing a three-way valve to connect the exhauster with the air-outlet and the supply-valve the supply-valve and the air-outlet are always operated in unison and made to coact with each other. My invention secures the best results with a minimum expenditure of heat and fuel.

What I claim as new, and desire to secure by Letters Patent, is—

1. The combination substantially as before set forth with a radiator or heater, a supply-pipe and a valve on the supply-pipe, of an air-pipe for removing air from the radiator or heater, a vacuum-chamber controlling the valve on the supply-pipe, a pipe connecting the air-pipe with the vacuum-chamber, and an exhauster connected with the air-pipe, and means for opening and closing the air-pipe, and for opening and closing the pipe connecting the air-pipe with the vacuum-chamber whereby the supply-valve may be opened when air is being drawn from the radiator or heater and closed when the air-outlet is closed.

2. The combination substantially as before set forth with a radiator or heater, a supply-pipe and a valve on the supply-pipe, of an air-pipe for removing air from the radiator or heater, a vacuum-chamber controlling the valve on the supply-pipe, a pipe connecting the air-pipe with the vacuum-chamber, and an exhauster connected with the air-pipe, and a valve on the air-pipe adapted to shut off the connection with the vacuum-chamber when the connection with the radiator or heater is opened, and to open the connection with the vacuum-chamber when the connection with the radiator or heater is shut off.

3. The combination, substantially as before set forth, with a radiator or heater, a supply-pipe, and a valve on the supply-pipe, of a vacuum-chamber controlling the valve on the supply-pipe, an air-pipe 8 for removing air from the radiator or heater, a pipe 9 connecting the air-pipe with the vacuum-chamber, an exhauster connected with the pipes 8 and 9, by the pipe 6, and a valve 10 provided with the piston 11 and the ports 14, 15 and 16, and means for operating the valve.

4. The combination, substantially as before set forth, with a radiator or heater, a supply-pipe, and a valve on the supply-pipe, of a vacuum-chamber controlling the valve on the supply-pipe, an air-pipe 8 for removing air from the radiator or heater, a pipe 9 connecting the air-pipe with the vacuum-chamber, a piston 18 connected with the stem of the supply-valve, a spring 19, an exhauster connected with the pipes 8 and 9, by the pipe 6, and a valve 10 provided with the piston 11 and the ports 14, 15 and 16, and means for operating the valve.

5. The combination with a radiator or heater, a supply-pipe, and a valve for controlling the radiator or heater, of an air-pipe for removing air from the radiator or heater, a vacuum-chamber for operating the controlling-valve, a pipe connecting the air-pipe with the vacuum-chamber, an exhauster connected with the air-pipe, and means for opening and closing the air-pipe, and for opening and closing the pipe connecting the air-pipe with the vacuum-chamber, whereby the controlling-valve may be opened when air is withdrawn from the radiator or heater and closed when the air-outlet is closed.

6. The combination with a radiator or heater, a supply-pipe, and a valve for controlling the radiator or heater, of an air-pipe for removing air from the radiator or heater, a vacuum-chamber for operating the controlling-valve, a pipe connecting the air-pipe with the vacuum-chamber, an exhauster connected with the air-pipe, and a valve on the air-pipe adapted to shut off the connection with the vacuum-chamber when the connection with the radiator or heater is opened, and to open the connection with the vacuum-chamber, when the connection with the radiator or heater is shut off.

7. In combination with a radiator, a supply-pipe for delivering the heating medium thereto, a valve for regulating the delivery of the heating medium, a fluid-pressure motor for actuating said valve, a pipe communicating with the fluid-pressure motor and with the radiator, an exhausting device communicating with said pipe, a valve 10 provided with piston 11, and the ports 14, 15 and 16 whereby a vent is provided for said pipe between the motor and the exhauster, and a thermostat adapted to operate the said valve, substantially as and for the purpose set forth.

8. In combination with a radiator, a supply-pipe for delivering a heating medium thereto, a valve for regulating the delivery of the heating medium, a fluid-pressure motor for actuating said valve, a pipe communicating with the fluid-pressure motor and with the radiator, an exhausting device communicating with said pipe, a valve 10 provided with piston 11, and the ports 14, 15 and 16, whereby a vent is provided for said pipe, and a thermostat adapted to be placed against different parts of the heating-surface and to be expanded by the heat from same and to thereby operate the valve 10.

In testimony whereof I have signed my name to this specification in the presence of two subscribing witnesses.

ANDREW G. PAUL.

Witnesses:
   THOS. W. ANDREW,
   HERBERT A. RHOADES.